United States Patent [19]
Anderson

[11] 4,118,448
[45] Oct. 3, 1978

[54] PREPARATION OF HIGH STRENGTH HALIDE BODIES

[75] Inventor: Rogers H. Anderson, Long Lake, Minn.

[73] Assignee: Honeywell Inc., Minneapolis, Minn.

[21] Appl. No.: 800,675

[22] Filed: May 26, 1977

Related U.S. Application Data

[63] Continuation of Ser. No. 634,394, Nov. 24, 1975, abandoned, which is a continuation of Ser. No. 445,371, Feb. 25, 1974, abandoned.

[51] Int. Cl.$^2$ ............................................. C04B 35/64
[52] U.S. Cl. ........................................ 264/1; 264/322; 264/325
[58] Field of Search ................. 264/320, 332, 325, 322

[56] References Cited

U.S. PATENT DOCUMENTS

| | | | |
|---|---|---|---|
| 3,185,750 | 5/1965 | Backner | 264/332 |
| 3,933,970 | 1/1976 | Rosette et al. | 264/1 |

OTHER PUBLICATIONS

Koepke et al., "Room Temperature Grain Growth in Potassium Chloride," *J. Appl. Phys.*, vol. 45, No. 2, pp. 969–970.

Becher et al.,"Strengthening effects in press forged KCl", *J. Appl. Phys.*, vol. 44, No. 6, pp. 2915–2916.

Johnson et al., "Mechanical Behavior of Single Crystal and Polycrystalline Cesium Bromide," *J. Am. Cer. Soc.*, vol. 47, No. 9, pp. 437–444.

Stokes et al., "Dislocations and Strength of Polycrystalline Ceramics," Natural Science Research, vol. 1, pp. 133–157 (1963).

Bernal et al., "Preparation and Characterization of Polycrystalline Halides for Use in High Power Laser Windows," AD-751655, 10-15-72.

*Primary Examiner*—Robert F. White
*Assistant Examiner*—John A. Parrish
*Attorney, Agent, or Firm*—Omund R. Dahle

[57] ABSTRACT

Fine-grained polygonized halide bodies are formed having comparable optical properties to a single crystal halide body. Heat and force are applied to the halide body to reduce the dimension of the body in one direction while the body is constrained in other directions.

13 Claims, 9 Drawing Figures

PREPARATION OF HIGH STRENGTH HALIDE BODIES

ORIGIN OF THE INVENTION

The present invention was made under a contract with the Department of Defense.

This is a continuation, of application Ser. No. 634,394, filed 11-24-75, now abandoned which is a Cont. of application Ser. No. 445,371, filed 2-25-74 now abandonded.

REFERENCE TO RELATED APPLICATIONS

Reference should be made to co-pending patent applications by B. G. Koepke entitled "High Strength Halides" Ser. No. 619,264, filed Oct. 3, 1975 now Pat. No. 4,085,172, which is a continuation of Ser. No. 445,394, filed Feb. 25, 1974 (now abandoned), and by E. Bernal G., B. G. Koepke, and R. B. Maciolek entitled "High Strength Halide Alloys" Ser. No. 617,350, filed Sept. 29, 1975 now U.S. Pat. No. 4,031,190, which is a continuation of Ser. No. 445,393 filed Feb. 25, 1974 (now abandoned), which were filed on the same date (Feb. 25, 1974) as this application.

BACKGROUND OF THE INVENTION

This invention is concerned with the formation of fine-grained halide bodies. In particular, the present invention is concerned with the preparation of high strength halide bodies for use as optical components in infrared systems.

One of the more critical problems encountered in the development of high power infrared lasers is the development of laser windows which are highly transparent to laser radiation at 10.6 microns and at 3 to 5 microns. At the present time, considerable research effort has been devoted to the development of laser windows from the so-called covalent compounds consisting typically of II-VI compounds such as cadmium telluride, zinc telluride and zinc selenide. The need for improved laser window materials, however, is well known. F. Horrigan et al, "Windows for High Power Lasers", *Microwaves*, Page 68 (January, 1969); M. Sparks, "Optical Distortion by Heated Windows in High Power Laser Systems", *J. Appl. Phys.*, 42, 5029 (1971).

The need for improved laser windows is based on the extremely high laser power throughput required and the fact that the laser windows constitute structural members. In order to maintain high throughout and minimize adverse effects, the amount of energy transferred to the window must be kept low. Laser beam energy can be transferred to the window in two ways: heating of the window caused by either bulk or surface absorption of the beam, or direct conversion of the beam energy to mechanical energy by Brillouin scattering or electrostriction. This energy transfer produces several undesirable effects such as lensing and birefringence, which result in degradation of beam quality and polarization. In extreme cases, severe stresses can be produced in the windows. These stresses, which are further aggravated by the fact that the windows are mounted in a cooling clamp, may lead to fracture of the windows.

The low absorption coefficient of the halides make them outstanding candidates for optical components in infrared systems. The alkali halides exhibit low absorption at 10.6 microns, and the alkaline earth halides exhibit low absorption in the 2 to 6 micron region. Furthermore, because the temperature coefficient of the index of refraction and the thermal expansion have opposite signs, the two effects tend to compensate optical path changes due to temperature, making these materials useful in applications in which heating by a laser beam is anticipated. Halide crystals, however have low yield strengths and are highly susceptible to plastic deformation. J. J. Gilman, "Plastic Anisotropy of LiF and Other Rock Salt Type Crystals", *Acta Met.*, 7, 608 (1959). These mechanical properties of single crystal halides have precluded their use as high power laser windows.

The outstanding transparity of the halide materials makes it very attractive to attempt to overcome their mechanical deficiencies. Halides can be strengthened without altering their optical properties by hot working of single crystals to produce fully dense polycrystalline material. R. J. Stokes and C. H. Li, *Materials Science Research*, Vol. 1, pages 133-157, edited by H. H. Stadelmaier and W. W. Austin, Plenum Press, New York, 1963; N. S. Stoloff et al, "Effective Temperature on the Deformation of KCl-KBr Alloys", *J. Appl. Phys.* 34, 3315 (1963); and R. J. Stokes, "Mechanical Properties of Polycrystalline Ceramics", *Proc. Brit. Ceram. Soc.*, 189 (1966). This technique involves the deformation and recrystallization of hot crystals to introduce grain boundaries and produce polycrystalline halide materials. The techniques described in these articles involved the extrustion of halide materials.

SUMMARY OF THE INVENTION

Fine-grained halide bodies may be produced by pressing, rolling, or a combination of these processes. It has been discovered, however, that pressing or rolling at the temperatures and strain rates necessary to yield extremely fine-grained material results in cracking of the halide body. The present invention eliminates the cracking problem, resulting in the production of crack free high strength hot pressed or hot rolled halide bodies.

In the method of the present invention, a halide body is heated to a temperature high enough to permit generalized flow. Force is applied to the halide body in a first direction to deform the halide body in the first direction. At the same time, constraint is applied to the halide body in directions other than the first direction. This constraint eliminates the cracking problem. In addition, constrained samples exhibit higher yield strengths than unconstrained samples.

DESCRIPTION OF THE PREFERRED EMBODIMENTS

PRESSING

With the method of the present invention, crack free, high strength, fine-grained polygonized halide bodies have been produced by hot pressing. The present invention has been successfully demonstrated with a number of halide materials including sodium chloride (NaCl), potassium chloride (KCl), alloys of KCl and potassium bromide (KBr), and alloys of KCl and rubidium chloride (RbCl). This specification will, for simplicity, describe only work on KCl.

In order to produce a fine-grained polygonized material by deformation of a single crystal billet, the billet must be at a temperature high enough to permit generalized flow. Generalized flow will occur when there are five independent slip systems operating in the material. At room temperature, KCl has only two independent slip systems. It is necessary, therefore, to heat the KCl to a temperature at which there are five independent slip systems. This temperature should not be so high, however, that substantial grain growth occurs, since the objective is to form a fine-grained material.

In KCl, the preferred temperature range is between about 100° C. and about 300° C. Best results have generally been achieved when the KCl body is heated to a temperatue between about 150° C. and about 200° C.

Figure 1:
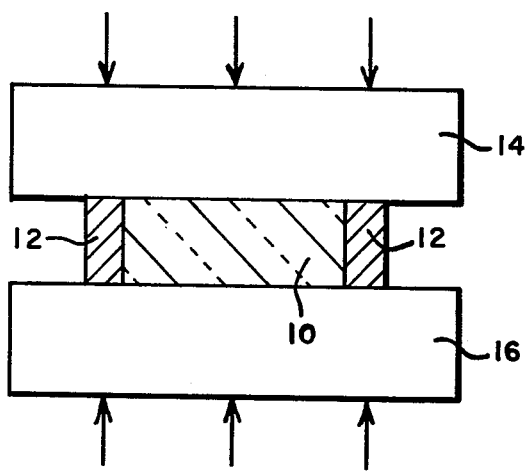
FIG. 1 schematically shows a constrained hot pressing technique.

FIG. 1 schematically shows a constrained pressing technique for forming polygonized KCl. The initial cylindrical KCl single crystal billet 10 is surrounded by a constraining ring 12. As rams 14 and 16 close, the deforming KCl billet 10 expands constraining ring 12 outward. Constraining ring 12 exerts a compressive hoop stress on the deforming crystal billet, thereby inhibiting fracture. Since fracture is suppressed, pressing can be carried out at lower temperatures and higher strain rates than is possible with unconstrained hot pressing. Both conditions result in structural refinement and improved mechanical properties in the as-pressed billet.

Constraining ring 12 may be annealed copper, brass, copper-brass, or aluminum. The low yield strength and high work hardening rate of annealed copper make it a good material for this purpose. Experience has shown that best results are obtained when a layer of polytetrafluoethylene tape is inserted between the billet and the constraining ring. The tape prevents interaction of the KCl and the constraining ring, further inhibiting cracking both during pressing and during removal of the ring.

Hot pressing of cylindrical KCl billets by the technique shown in FIG. 1 was performed at temperatures between about 100° C. and 300° C. The pressing was done in the >100< direction. The pressing was typically performed at a constant ram speed in a 500,000 pound hydraulic press under a vacuum of 10 micrometers of mercury.

Figure 2A:
FIGS. 2a and 2b are photographs of hot pressed KCl billets formed with and without constraint, respectively.
Figure 2B:
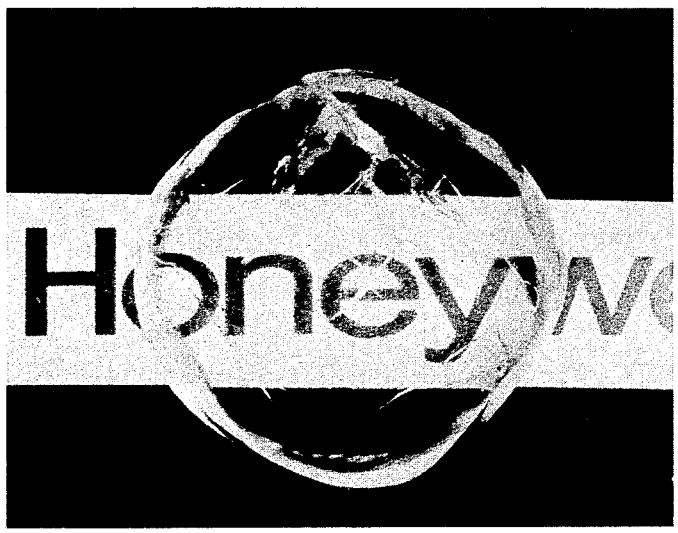

FIG. 2a shows a polygonized KCl billet which was hot pressed to 60% reduction in thickness in a copper sleeve at 150° C. FIG. 2b shows a polygonized KCl billet which was hot pressed to 60% reduction in thickness at 175° C. without a constraining ring. The initial strain rate in both cases was 0.008 minu es$^{-1}$. The unconstrained pressing contained many cracks as shown in FIG. 2b. On the other hand, the constrained pressing, although formed at a lower temperature, was crack free. The lines of the surface of the billets shown in FIGS. 2a and 2b were from shallow square depressions machined into the platen faces to prevent the billets from shifting laterally during pressing.

Yield strengths (3-point bending proportional limits) of the unconstrained pressing were in the range of 4,000 to 5,000 psi, whereas those of constrained pressing were 5,000 to 6,000 psi. In both materials, the means grain size was approximately 4 to 5 microns. Yield strengths as high as 6,700 psi have been measured on constrained pressing made at lower temperatures. These values represent improvements in yield strength of 8 to 12 times that of the starting single crystal.

Figure 3:
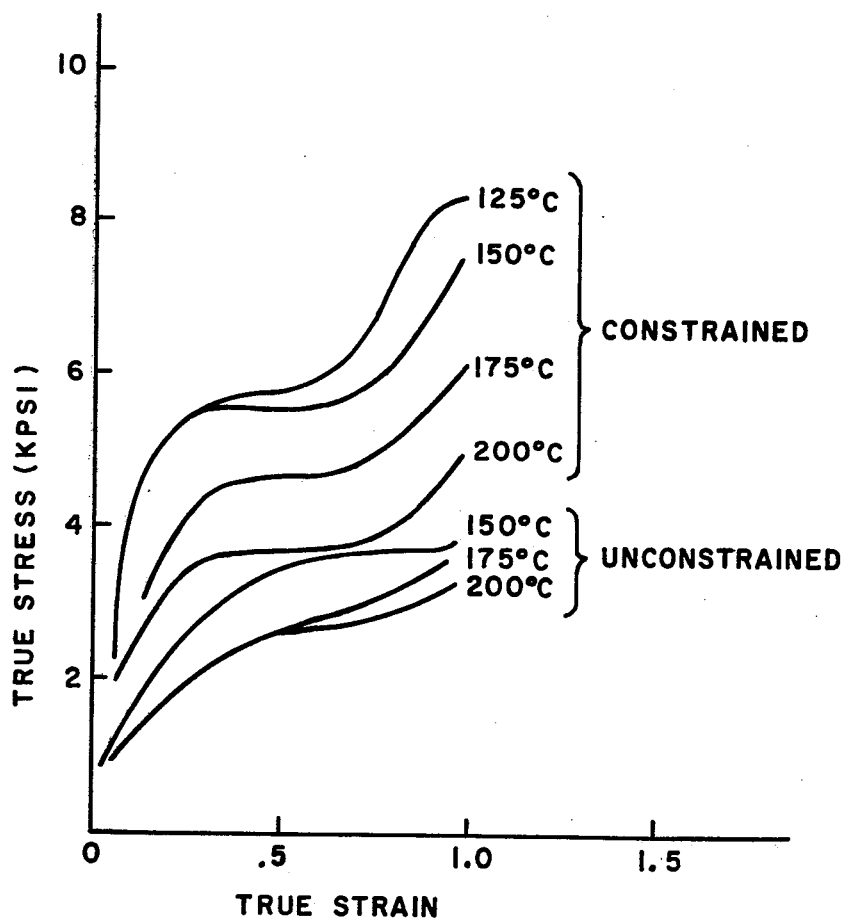
FIG. 3 shows true stress-strain curves for constrained and unconstrained KCl billets.

Comparison of stress-strain curves of constrained and unconstrained pressing computed from the forging presses are shown in FIG. 3. The constrained billets deformed at higher stresses than unconstrained billets. At higher strains, the stress-strain curves of the constrained billets also increased rapidly with strain. The yield stresses of material pressed under constraint generally varied linearly with the final forging stress.

Figure 4:
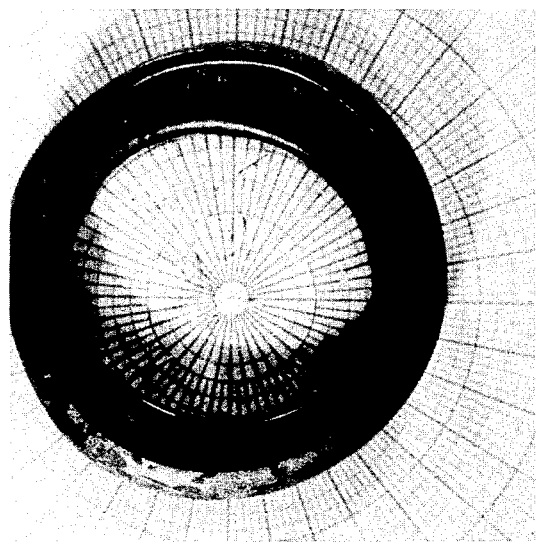
FIG. 4 is a photograph of another polygonized KCl billet hot pressed by the technique shown in FIG. 1.

One problem was encountered in the constrained pressing technique shown in FIG. 1. During pressing, the frictional forces acting between the platens and the top and bottom edges of constraining ring 12 impeded the expansion of the ring in these regions. As a result, the billet bulged into the center region of the constraining ring. When the constraining ring bulged, the amount of usable area of the pressing was decreased. FIG. 4 shows a KCl billet pressed to 60% reduction at 150° C. by the technique shown in FIG. 1. The bulging of the constraining ring is apparent.

Figure 6:
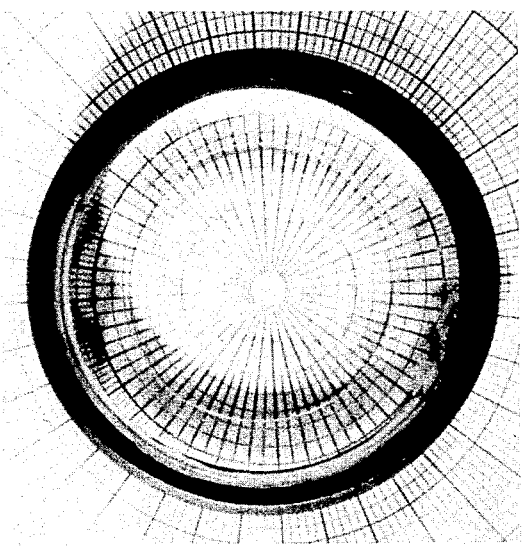
FIG. 6 is a photograph of a polygonized KCl billet hot pressed by the technique shown in FIG. 5.
Figure 5:
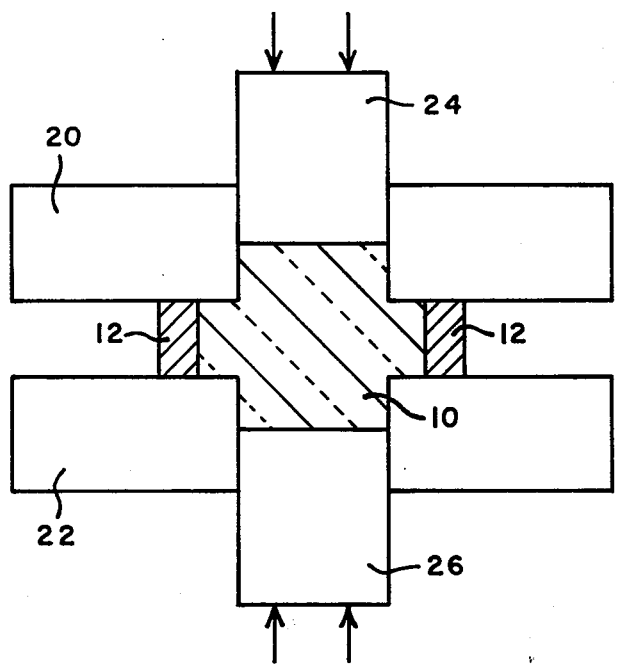
FIG. 5 schematically shows a double piston technique for constrained hot pressing.

To overcome the bulging problem, a double piston technique of constrained pressing was developed. This technique is schematically shown in FIG. 5. In this technique, constraining ring 12 expands between two movable plates 20 and 22 as the billet 10 is compressed between two pistons 24 and 26. In this way, the frictional forces retarding the expansion at the top and bottom edges of constraining ring 12 are minimized and bulging is essentially eliminated. FIG. 6 shows a KCl crystal pressed to 60% reduction at 150° C. by the technique illustrated in FIG. 5. The absence of bulging in the constraining ring is apparent. It is clear, therefore, that the amount of usable material in the billet has been increased.

In the double piston technique, the appropriate areas of the die and billet 10 are lubricated at room temperature with silicone oil. Billet 10 is then loaded into the fixture. The bolts (not shown) which align upper and lower plates 20 and 22 also are tightened to apply force against constraining ring 12 to maintain contact. The assembly is then heated to the desired temperature.

During deformation, the volume of contraining ring 12 must be conserved. As the constraining ring 12 moves radially, therefore, it will also shorten in height. It is important that plates 20 and 22 move to provide constraint for billet 10 during deformation and the vertical shortening of constraining ring 12. Plates 20 and 22, which are movable, maintain contact with the constraining ring 12. The force to maintain this contact is supplied by the frictional forces developed between pistons 24 and 26 and plates 20 and 22 by the billet residue trapped in the clearance between these parts plus th hydrostatic pressure exerted by the remaining billet between plates 20 and 22.

ROLLING

Figure 7:
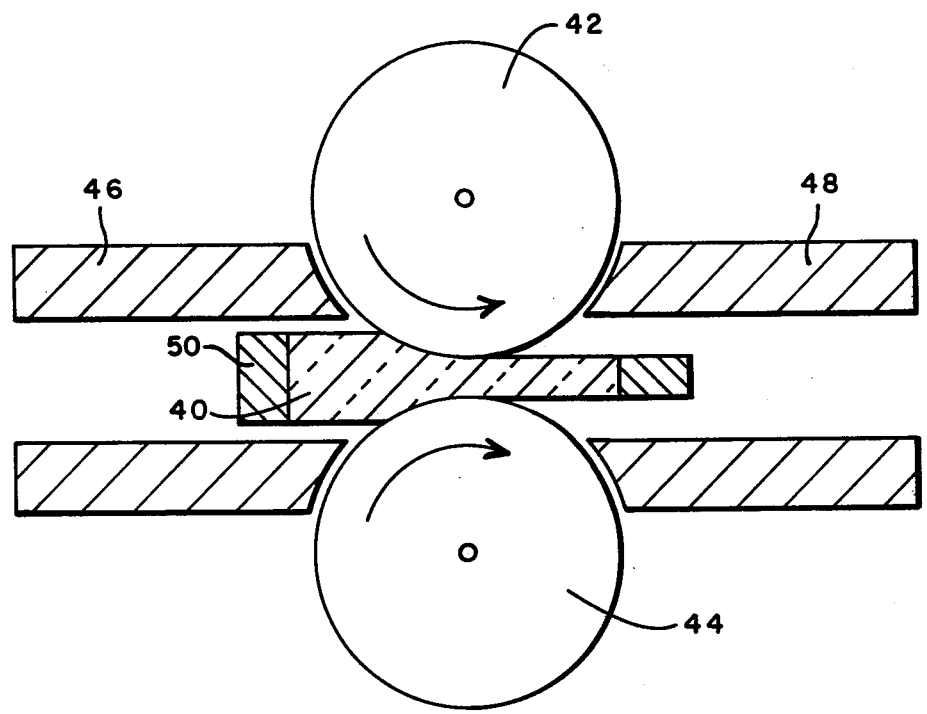
FIG. 7 schematically shows a hot rolling technique for forming polygonized halide bodies.

FIG. 7 schematically shows the method for hot rolling halide billets. The KCl billet 40 is passed between heated rolls 42 and 44. Heated rolls 42 and 44 apply pressure and heat to billet 40. Tunnel furnaces 46 and 48 on both sides of rolls 42 and 44 are typically maintained at 25° to 30° C. higher than the temperature of the rolls. Billet 40 may be passed back and forth between the heated rolls 42 and 44 a number of times. Each time, the billet 40 is further compressed in one dimension.

Figure 8:
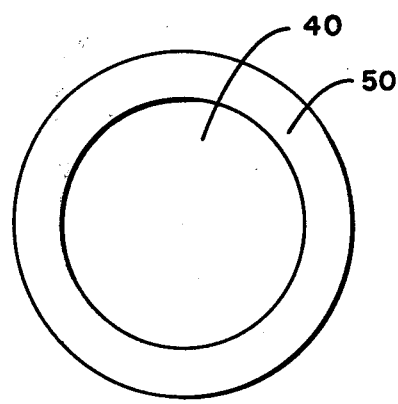
FIG. 8 shows the top view of a billet and constraining ring used in the hot rolling apparatus of FIG. 7.

As in the case of hot pressing, it was found that unconstrained hot rolling resulted in substantial cracking of billet 40. As a result, a constraining ring similar to that used in hot pressing must be used with the hot rolling technique of FIG. 7. FIG. 8 shows the top view of a KCl billet 40 with an aluminum constraining ring 50. The constraining ring 50 not only prevents cracking but also increases the friction between the billet and the rolls, thereby allowing larger reductions per pass.

KCl billets have been hot rolled at various roll speeds and temperatures. All samples were cross rolled. Rolling speeds of 0.35, 3.5, and 9.0 inches per minute have been used. Temperatures of 250° C. and 200° C. have been used. In each case, the KCl billets were initially 0.5 inches thick and 1.5 inches in diameter. The samples were given two, four, or six passes at reductions corresponding to 10% true strain per pass. Three crystal orientations were used. Crystals have been rolled on {100}, {110}, and {111} faces. Crystals rolled on {100} faces were rolled in [110] and [100] directions. Those rolled on {110} faces were mainly rolled in [100] and [110] directions, although in one series the [111] and [112] directions were used. Those crystals rolled on {111} faces were rolled in [112] and [110] directions. After a sample was given the last reduction, it was turned 90° and given one straightening pass with no reduction.

In billets rolled on {100} faces in [110] directions, the mechanical properties do not appear to be a function of the total deformation of the billet. The mechanical properties were, however, affected by the rolling temperatures. Yield strengths of billets rolled at 250° C. were typically in the 2300 to 2800 psi range. Billets rolled at 200° C., on the other hand, generally had yield strengths exceeding 3000 psi. The grain size of the material rolled at the lower tempeature was finer than the grain size of material rolled at higher temperatures.

The effect of rolling direction on the properties of KCl billets rolled on {100} faces was examined by rolling a number of KCl billets on the {100} faces in [100] directions. All rollings were performed at 250° C. With one exception, the mechanical properties of these billets fell in the same range as the billets rolled in [100] directions at 250° C. (1800 to 2800 psi yields). The grain sizes, however, were smaller (in the 3 to 5 micron range).

KCl billets were rolled on {100} and {111} faces to determine whether changing the orientation of the rolled surfaces has any effect on the resulting billet. The billets rolled on {110} faces at 250° C. had yield strengths which exceed 3000 psi. Although the strain rates were lower, billets cross rolled in [100] and [110] directions on {110} faces at 200° C. exhibited a yield strength of about 4900 psi. This yield strength is considerably above all other material produced by hot rolling thus far.

The crystals rolled on {111} faces in [211] and [110] directions were rolled at 250° C. and 200° C. In all cases the yield strengths in the 3400 to 3700 psi range, while those rolled at 200° C. had yield strengths in the 3800 and 4100 psi range. The grain sizes were approximately 3 to 4 microns.

CONCLUSION

In conclusion, high strength halide billets have been formed by the method of the present invention. These billets are fully dense polygonized material having optical properties which are comparable to single crystal material. The constraint technique of the present invention allows hot working at lower temperatures without cracking of the billets. This results in higher yield strengths than are possible without constraint.

Although the present invention has been described with reference to a series of preferred embodiments, skilled workers in the art will recognize that various modifications may be made without departing from the spirit and scope of the invention. As previously mentioned, formation of high strength KCl has been used as an example. The present invention, however, has been successfully demonstrated with other halide materials and is not, therefore, limited to KCl. The particular wavelength being used in the optical system will determine whether an alkali, or alkaline earth, or other halide will be used. The specific temperatures used with KCl will, of course, differ somewhat with different halide materials. Although single constraining rings have been specifically shown, it will be recognized that multiple or preshaped constraints may be appropriate in some cases.

I claim:

1. A method of forming a fine-grained halide optical element, the method comprising:
   heating an essentially single crystal alkali halide body to a temperature at which essentially generalized flow can occur but not so high that substantial grain growth occurs during processing;
   applying compressive force to the halide body to reduce the dimension of the halide body along a first axis and producing a corresponding expansion of the halide body in directions other than along the first axis thereby producing a fine-grained structure in the halide body; and,
   constraining the halide body in directions other than along the first axis, during the heating and applying force steps from the commencement of applying compressive force, to inhibit crack formation in the halide body.

2. The method of claim 1 wherein applying force comprises uniaxial pressing.

3. The method of claim 1 wherein applying force comprises rolling.

4. The method of claim 1 wherein constraining is achieved by a sleeve around the halide body which induces a compressive hoop stress on the halide body while heating and applying force.

5. The method of claim 4 wherein the sleeve is copper.

6. The method of claim 4 wherein the sleeve is aluminum.

7. The method of claim 1 wherein the alkali halide body is substantially potassium chloride.

8. The method of claim 7 wherein heating is to a temperature between about 100° C. and about 300° C.

9. The method of claim 8 wherein heating is to a temperature between about 150° C. and about 200° C.

10. The method of claim 1 wherein constraining is achieved by a metal sleeve around the halide body and wherein applying force is achieved by pressing.

11. The method of claim 10 wherein the compressive force is applied by two pistons which apply pressure to opposite surfaces of the halide.

12. A method of forming an optical element, the method comprising:

heating an essentially single crystal alkali halide body to a temperature at which essentially generalized flow can occur but not so high that substantial grain growth occurs;

compressing the halide body along a first axis thereby causing an accompanying expansion of the halide body in directions normal to the first axis and producing a fine-grained structure in the halide body; and constraining the halide body in directions other than along the first axis essentially throughout the compressing step, wherein the constraining inhibits crack formation in the halide body.

13. A method of forming an optical element, the method comprising:

hot working an essentially single crystal alkali halide body to reduce a dimension of the halide body along a first axis and cause an accompanying expansion of the halide body in directions normal to the first axis, but at a temperature not so high, however, that substantial grain growth occurs, thereby producing a fine-grained structure in the halide body; and applying, during the hot working from commencement of deformation of the halide body, a constraining force to the halide body in directions other than the first axis to inhibit crack formations in the halide body.

* * * * *